US009569509B2

(12) United States Patent
White

(10) Patent No.: US 9,569,509 B2
(45) Date of Patent: Feb. 14, 2017

(54) OPTIMIZING RESULT PRESENTATION OF A DATABASE OPERATION

(71) Applicant: salesforce.com, inc., San Francisco, CA (US)

(72) Inventor: Seth John White, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 176 days.

(21) Appl. No.: 14/013,687

(22) Filed: Aug. 29, 2013

(65) Prior Publication Data

US 2014/0067796 A1 Mar. 6, 2014

Related U.S. Application Data

(60) Provisional application No. 61/696,584, filed on Sep. 4, 2012.

(51) Int. Cl.
*G06F 7/00* (2006.01)
*G06F 17/30* (2006.01)

(52) U.S. Cl.
CPC .............. *G06F 17/30554* (2013.01)

(58) Field of Classification Search
CPC ............ G06F 17/30855; G06F 17/30716; G06F 17/30595; G06F 17/30554; G06F 17/30424; G06F 17/30584
USPC ............. 707/706, 713, 718, 722, 999.003, 707/E17.005
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |

(Continued)

*Primary Examiner* — Md. I Uddin
(74) *Attorney, Agent, or Firm* — Blakely, Sokoloff, Taylor & Zafman

(57) ABSTRACT

Techniques for optimizing result presentation for a database query. A database query is received. The database query is performed with a clause indicating one or more offset values to be used in displaying results from the database query. The one or more offset values indicate a subset within the results from the database query to be presented. An order is imposed on the results from the database query. The subset is presented as determined by the one or more offset values.

18 Claims, 5 Drawing Sheets

(56) References Cited

U.S. PATENT DOCUMENTS

| | | |
|---|---|---|
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,945,683 B1 * | 5/2011 | Ambrose .......... G06F 17/30902 707/609 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0205638 A1 * | 10/2004 | Thomas et al. ............... 715/526 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2011/0295814 A1 * | 12/2011 | Kothari et al. ............... 707/687 |
| 2013/0173594 A1 * | 7/2013 | Xu .................... G06F 17/30424 707/722 |

* cited by examiner

OPTIMIZING RESULT PRESENTATION OF A DATABASE OPERATION

PRIORITY AND RELATED APPLICATION DATA

This application claims priority to Provisional U.S. Patent App. No. 61/696,584, filed on Sep. 4, 2012, entitled "System and Method for Optimizing the Result of a Database Operation," which is incorporated herein by reference in its entirety and for all purposes.

TECHNICAL FIELD

Embodiments relate to database operations. More specifically, embodiments relate to techniques to provide a more useful and efficient presentation of results from one or more database operations.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

With ever-growing organizations using huge databases, it is challenging to handle very large query requests require complex data process. Moreover, these organizations are seeking efficient ways of ensuring that unusually large query requests do not tie up the system and interrupt smooth execution of other queries.

Conventional object-relational mapping technologies such JPA and Hibernate, also offer paging functionalities. However, these functionalities are limited in the sense that can be imbedded in the query language syntax. Instead, these applications provide additional external methods for specifying paging behavior. As a result, these applications are not suited for the prevalent database environment such as Oracle Application Express (abbreviated APEX).

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

The technology disclosed includes a method for handling very large queries to support web-style paging of query results returned from operations performed on a database. In one implementation, a new OFFSET clause can be added in a query language that can be included very large queries like salesforce object query language (abbreviated SOQL). In conventional database query processing, when pages that are a subset of the total number of rows selected by a query are returned, the query results need to be ordered for the query to be user-friendly. The query author, who can explicitly specify an ordering for the query results, usually mechanically performs the task of ordering the query results.

But, this limitation can be a source of error in paging queries since queries are structured as per total order relation instead of partial ordering. The query results that lack specifications by an author do not generate errors until a system goes into result generation. As a result, a system may return queries in their default order even when an explicit ordering is not specified in the query. However, if a query changes during execution due to changes in the underlying data or any other reason, the ordering of rows can suddenly change and lead to malfunctioning in the data processes.

The technology disclosed herein includes detecting the paging queries that have not been specified in an explicit total order and enhancing the query with a total ordering automatically. This implementation allows better support in platforms that included web applications that require paging functionality for results of large queries such as SOQL. Web applications typically start by displaying the first 20 rows of data on a single screen after executing a search query and users can be interested in viewing only the last page(s). Additionally, users may wish to know to the number of pages in a query results, however, providing such information can be expensive as they require the database to compute the entire result set.

In one embodiment, the technology disclosed herein can be used to provide application programming interface (API) such as Apex or Force.com a method to select contiguous subset of the records returned by large queries such as SOQL.

Figure 1:
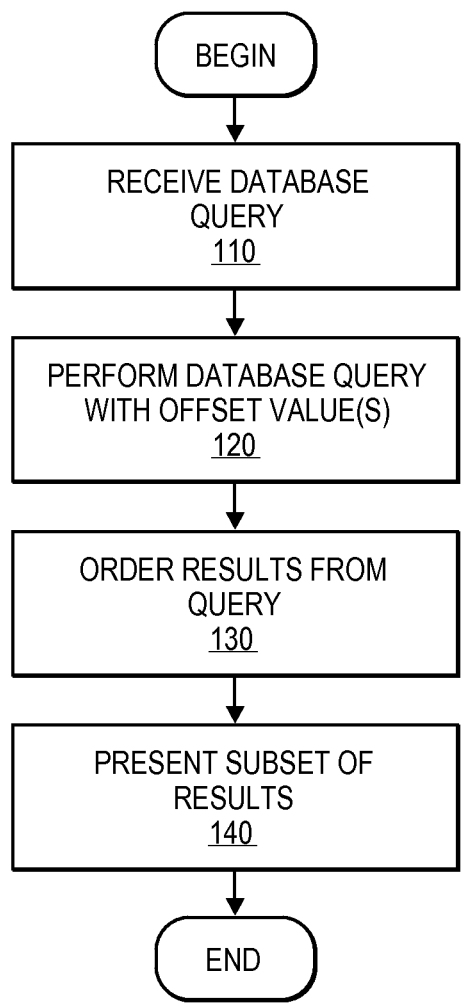
FIG. 1 is one embodiment of a flow diagram for presenting results of a database query operation.

FIG. 1 is one embodiment of a flow diagram for presenting results of a database query operation. In one embodiment, the example of FIG. 1 may be provided within a multitenant database environment (examples described in greater detail below); however, the technique described herein can be provided in other, non-multitenant database, environments as well.

A database query is received, 110. In one embodiment, the database query may have an OFFSET clause, which can take the following form:

```
SELECT fieldlist
FROM objectType
[WHERE conditionExpression]
ORDER BY fieldOrderByList
LIMIT number_of_rows_to_return
OFFSET number_of_rows_to_skip
```

In one embodiment, the OFFSET clause can be used to specify the starting row offset into the result set returned by your query. This allows paging of large result sets, in scenarios where users need to quickly jump to a particular subset of the entire results. Because the offset calculation is done on the server and only the result subset is returned, using OFFSET is more efficient than retrieving the full result set and then filtering the results locally. For example, the following SOQL query with an OFFSET clause can be supported using the techniques described herein:

```
SELECT Name
FROM Merchandise_c
WHERE Price_c > 5.0
ORDER BY Name
LIMIT 100
OFFSET 10
```

For example, in a very large query such as SOQL that returns 50 rows, a user can use OFFSET 10 in the query to skip in the first 10 rows. The result of such a query operation would be a subset of the full result set, returning rows 11 through 111 of the full set.

The following example shows the use of the ORDER BY clause along with OFFSET clause in SOQL query syntax. In yet another implementation, an ORDER BY clause can be used along with the OFFSET clause to ensure that the result set ordering is consistent. The row order of a result set that does not have an ORDER BY clause will have a stable ordering, however the ordering key is subject to change and should not be relied on.

```
SELECT Name, Id
FROM Merchandise_c
ORDER BY Name
LIMIT 100
OFFSET 0
```

The following example is a variation of the use of LIMIT clause in combination with OFFSET clause in SOQL query syntax, where a user can retrieve the next 100 rows, 101 through 201. This implementation can allow the potentially usefulness of large queries like SOQL for the implementation of cloud APIs like Java Cloud JPA.

```
SELECT Name, Id
FROM Merchandise_c
ORDER BY Name
LIMIT 100
OFFSET 100
```

In yet another implementation, reversing the sort order in the large query like an SOQL query can return the pages at the end of a result set. For paging to be user-friendly, results must be ordered deterministically using the ORDER BY clause.

In yet another implementation, large queries like SOQL paging queries can result in many SQL queries that are identical except for the LIMIT and OFFSET values. A user can map these values to SQL bind variables when using query languages such as Oracle, to limit the amount of parsing and optimization done by them.

The database query is performed and the OFFSET value(s) are used as described above, 120. As described herein, the OFFSET value(s) can be used to present to a user only a subset of the results, for example, a limited number of rows from a database.

The results are ordered, 130. In one embodiment, the ordering is determined by the query, as in the examples above. In one embodiment, some sort of well-defined order is imposed on the query results so that subsets of the results are predictable. In one embodiment, different ordering can be imposed based on, for example, query shape and/or size. For example, in an object retrieval query each object has ID field automatically generated and the result is ordered based on the ID field. As another example, for an aggregate query a set fields can be selected in the SELECT clause of the query to create a unique query.

The results of the query can be presented, 140. For example, a subset of the results can be presented to a user via a display device. The results can be shown in subset groups, for example.

In yet another implementation, the technology disclosed herein does not use assertion consumer service (abbreviated ACS), unlike other APIs like queryMore and has a stateless approach that does not cache data in the middle tier. This implementation allows great scalability and does not include materialization of ID set for the entire query and results in the initial page of results coming back sooner.

The example of illustrating the use of technology disclosed herein in database environment such as SOQL, Apex and Force.com should not be taken as limiting or preferred. This example sufficiently illustrates the technology disclosed without being overly complicated. It is not intended to illustrate all of the technologies disclosed. For instance, it does not illustrate use of query paging and optimization in SOAP, REST, queryMore, UnQL, YQL, QUEL and other query languages and APIs.

Accordingly, these implementations can save valuable computation time and are suited for use with: devices with a small form factor, limited interactive capability, limited display size, limited memory or storage capacity, limited processing power and short battery life; and/or with networks that have/are not consistently available, slow data transfer rates, erratic data transfer services, and no consistent standards; with data having massive quantity and that is not organized for mobile users; with users that have short attention spans, no patience, are on the move, and are routinely in awkward or limited usage situations; and with managers who have security concerns and where applications, devices, and users require a new management layer.

Figure 2:
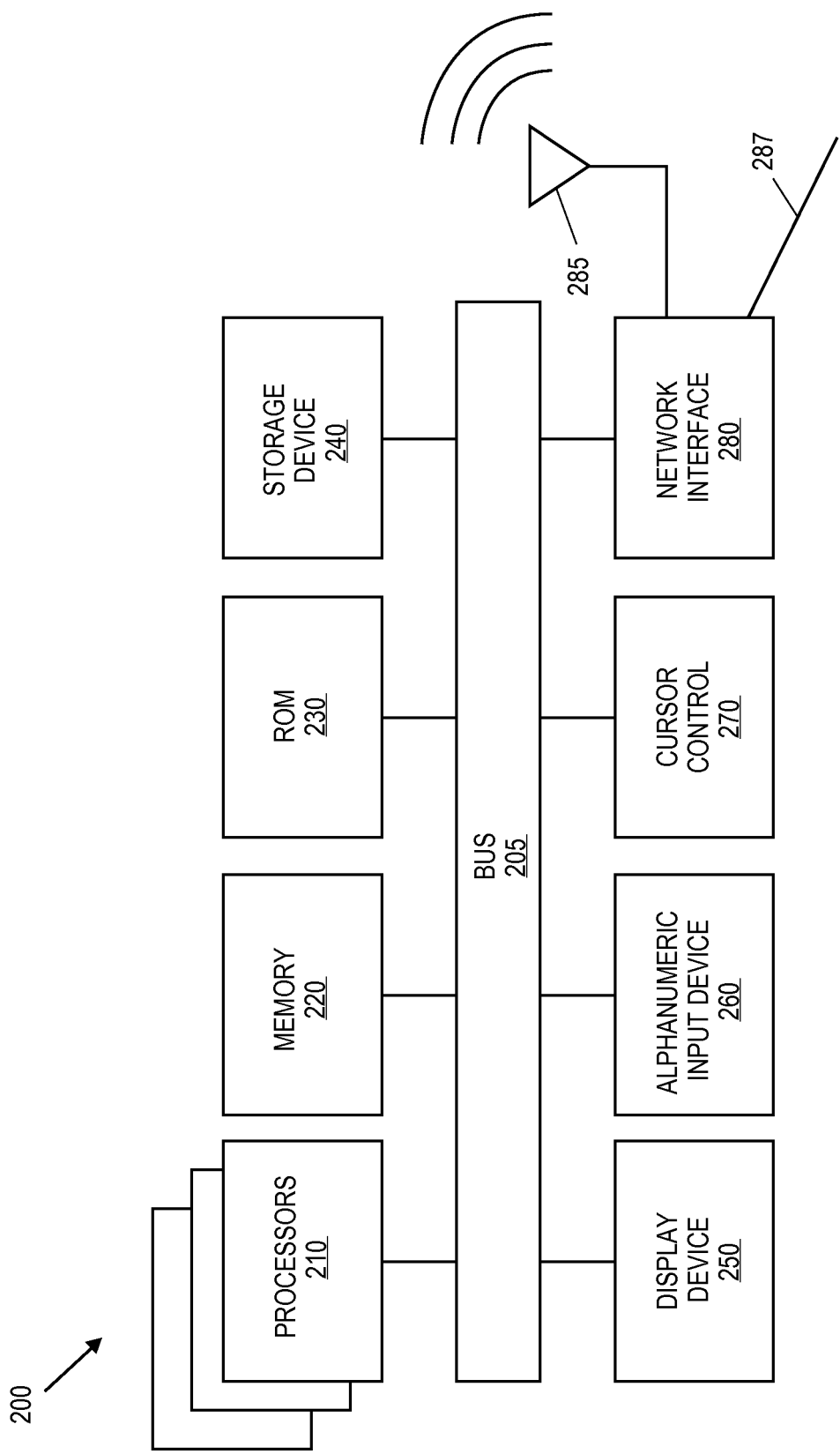
FIG. 2 is a block diagram of one embodiment of an electronic system.

FIG. 2 is a block diagram of one embodiment of an electronic system. In one embodiment, the electronic system of FIG. 2 can be used to provide the functionality described with respect to FIG. 1 and instructions to provide the functionality described herein can be stored within an electronic system. The electronic system illustrated in FIG. 2 is intended to represent a range of electronic systems (either wired or wireless) including, for example, desktop computer systems, laptop computer systems, cellular telephones, personal digital assistants (PDAs) including cellular-enabled PDAs, set top boxes, tablets, etc. Alternative electronic systems may include more, fewer and/or different components.

Electronic system 200 includes bus 205 or other communication device to communicate information, and processor 210 coupled to bus 205 that may process information. While electronic system 200 is illustrated with a single processor, electronic system 200 may include multiple processors and/or co-processors. Electronic system 200 further may include random access memory (RAM) or other dynamic storage device 220 (referred to as main memory), coupled to bus 205 and may store information and instructions that may be executed by processor 210. Main memory 220 may also be used to store temporary variables or other intermediate information during execution of instructions by processor 210.

Electronic system 200 may also include read only memory (ROM) and/or other static storage device 230 coupled to bus 205 that may store static information and instructions for processor 210. Data storage device 240 may be coupled to bus 205 to store information and instructions. Data storage device 240 such as a magnetic disk or optical disc and corresponding drive may be coupled to electronic system 200.

Electronic system 200 may also be coupled via bus 205 to display device 250, such as a cathode ray tube (CRT) or liquid crystal display (LCD), to display information to a user. Alphanumeric input device 260, including alphanumeric and other keys, may be coupled to bus 205 to communicate information and command selections to processor 210. Another type of user input device is cursor control 270, such as a mouse, a trackball, or cursor direction keys to communicate direction information and command selections to processor 210 and to control cursor movement on display 250.

Electronic system 200 further may include network interface(s) 280 to provide access to a network, such as a local area network. Network interface(s) 280 may include, for example, a wireless network interface having antenna 285, which may represent one or more antenna(e). Network interface(s) 280 may also include, for example, a wired network interface to communicate with remote devices via network cable 287, which may be, for example, an Ethernet cable, a coaxial cable, a fiber optic cable, a serial cable, or a parallel cable.

In one embodiment, network interface(s) 280 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 280 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 3:
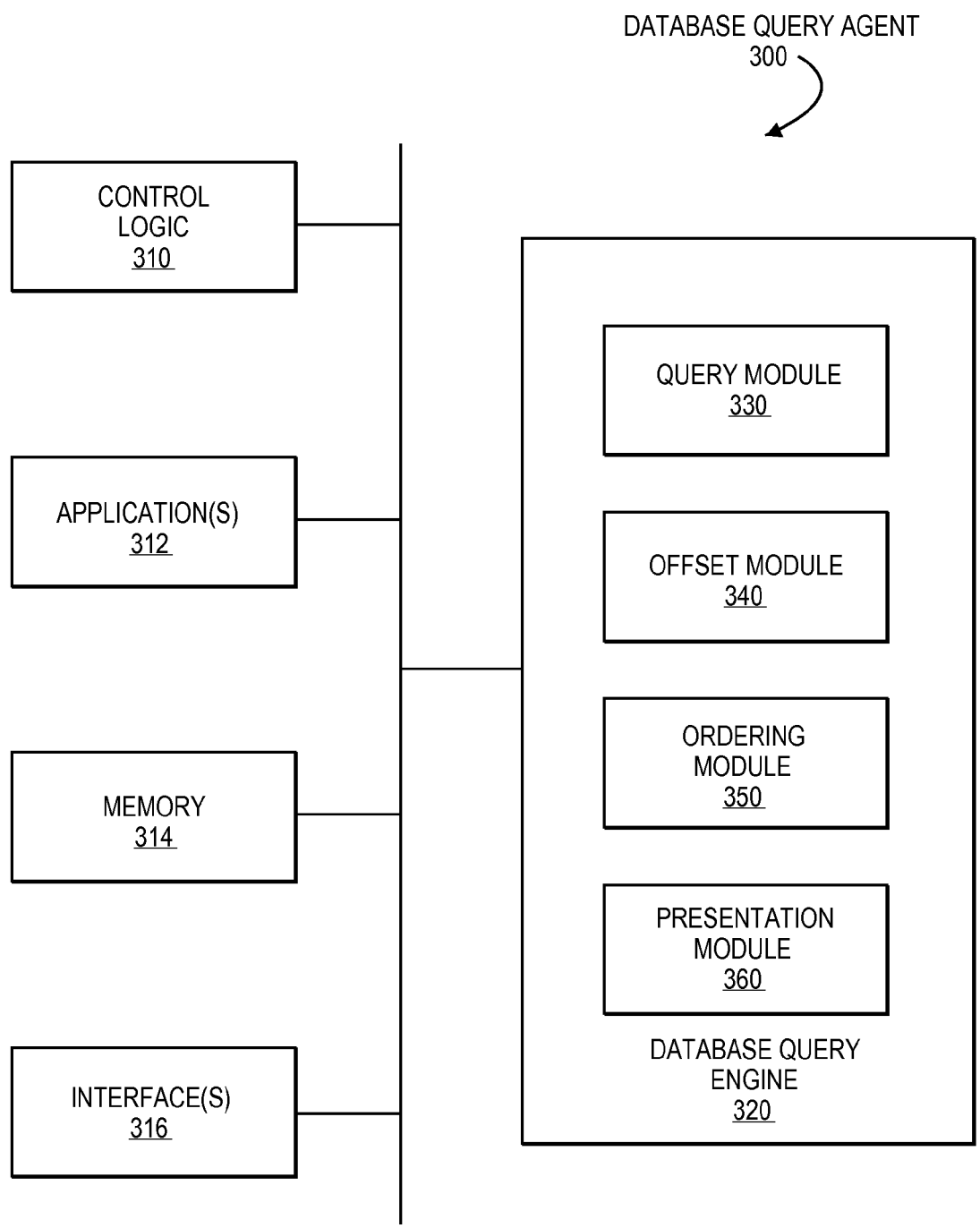
FIG. 3 is a block diagram of one embodiment of an agent that may be utilized to support result handling as described herein.

FIG. 3 is a block diagram of one embodiment of an agent that may be utilized to support result handling as described herein. The functionality of database query agent 300 can be provided as part of a multitenant database environment, or a non-multitenant database environment.

Database query agent 300 includes control logic 310, which implements logical functional control to direct operation of database query agent 300, and/or hardware associated with directing operation of database query agent 300. Logic may be hardware logic circuits and/or software routines. In one embodiment, database query agent 300 includes one or more applications 312, which represent code sequence and/or or programs that provide instructions to control logic 310.

Database query agent 300 includes memory 314, which represents a memory device and/or access to a memory resource for storing data and/or instructions. Memory 314 may include memory local to database query agent 300, as well as, or alternatively, including memory of the host system on which database query agent 300 resides. In one embodiment, database query agent 300 also includes one or more interfaces 316, which represent access interfaces to/from (an input/output interface) database query agent 300 with regard to entities (electronic or human) external to database query agent 300.

Database query agent 300 also includes database query engine 320, which represents one or more functions or modules that enable database query agent 300 to provide the sharing control services as described above. The example of FIG. 3 provides several modules that may be included in database query engine 320; however, different and/or additional modules may also be included.

Example modules that may be involved in providing the functionality described herein include query module 330, offset module 340, ordering module 350 and presentation module 360. Additional modules not illustrated may also be included to provide database functionality. Each of these modules may further include other sub-modules to provide other functions. As used herein, a module refers to routine, a subsystem, logic circuit, microcode, etc., whether implemented in hardware, software, firmware or some combination thereof.

Query module 330 operates to receive and parse queries. Query module 330 may also cause queries to be performed on a database (not illustrated in FIG. 3). Offset module 340 operates to handle database queries having an OFFSET (or similar) clause as described herein. Similarly, ordering module 350 operates to handle database queries having an ORDER BY (or similar) clause as described herein. Presentation module 360 operates to prepare the query results to be presented, for example, displayed to a user. Other types of presentation can also be supported, for example, transmitted (e.g., email, instant message, feed post) for later display.

Figure 4:
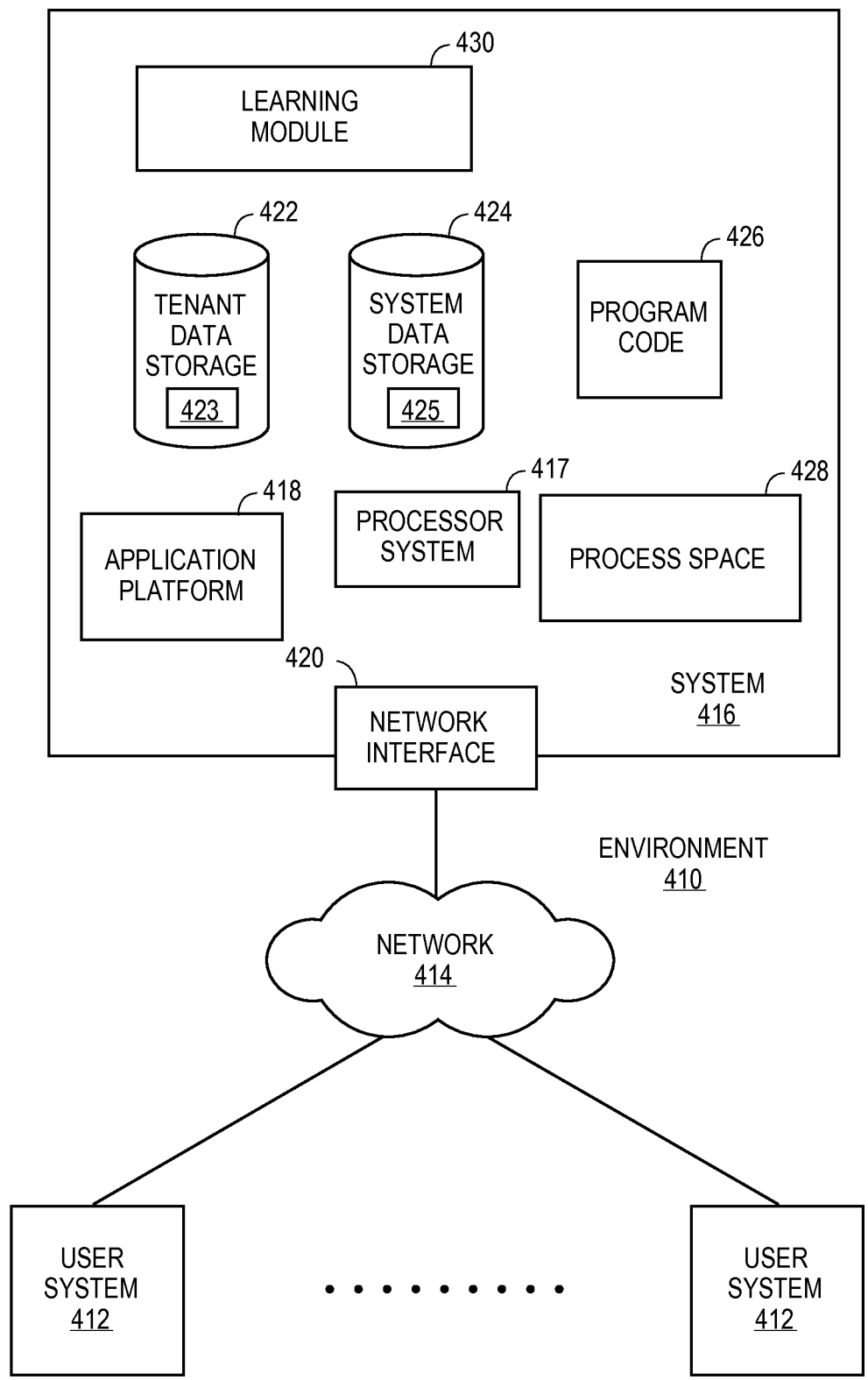
FIG. 4 illustrates a block diagram of an environment where an on-demand database service might be used.

FIG. 4 illustrates a block diagram of an environment 410 wherein an on-demand database service might be used. The query techniques and mechanisms described herein may be utilized in an on-demand, or multitenant, database environment. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein.

A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator.

In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared.

In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414.

Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
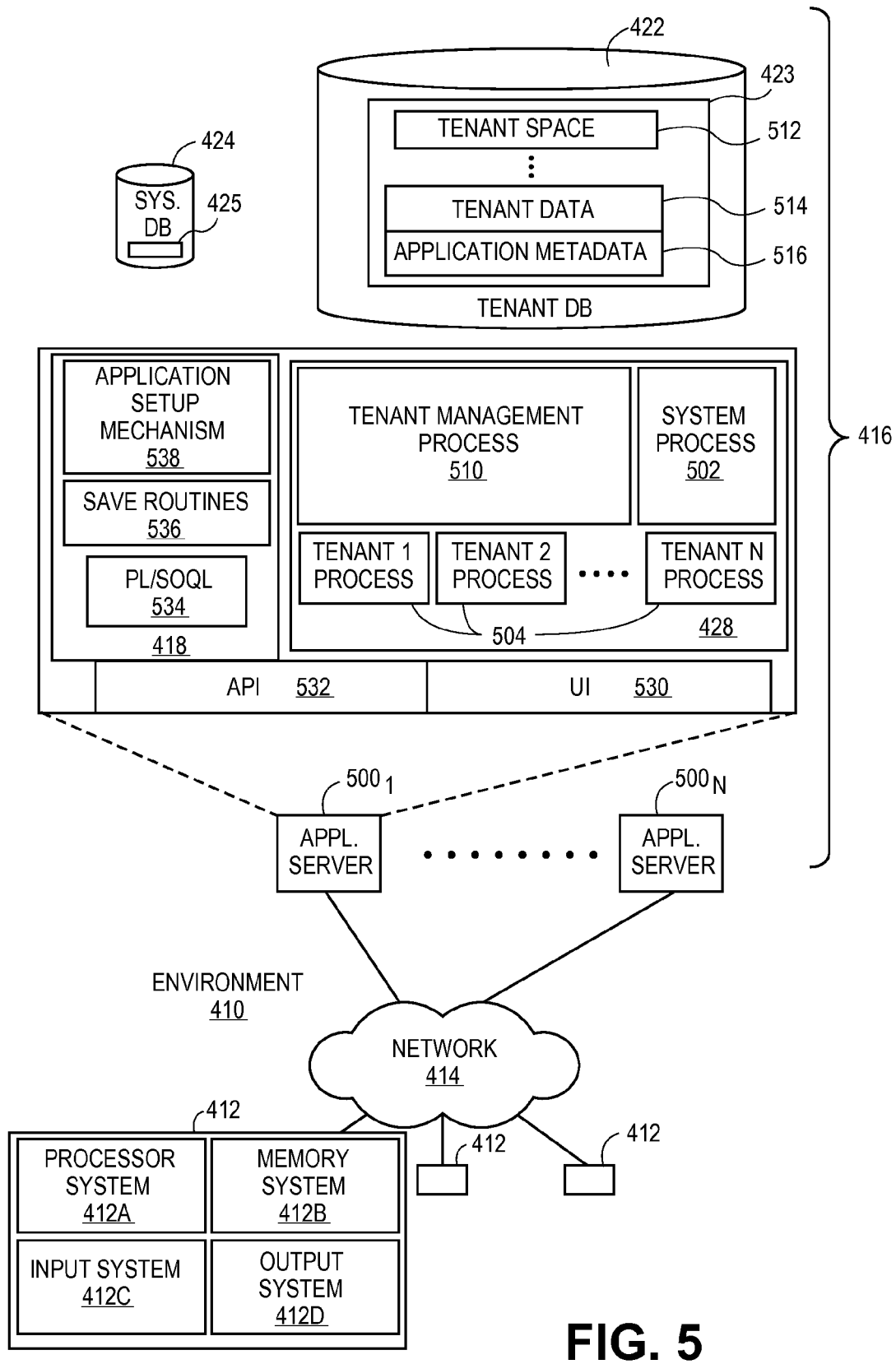
FIG. 5 illustrates a block diagram of an environment where an on-demand database service might be used.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks.

As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data.

Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412.

The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532.

A detailed description of some PL/SOQL language embodiments is discussed in commonly owned co-pending U.S. Provisional Patent Application 40/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500.

In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   receiving, with a database query agent provided by a hardware database server, one or more paging queries, wherein the queries comprises salesforce object query language (SOQL) compliant query syntax, where the SOQL implemented in cloud APIs and does not use assertion consumer service (ACS);
   detecting whether any of the one or more paging queries have not been specified with an explicit total order;
   enhancing automatically and with the database query agent, for the one or more paging queries without an explicit total order with a total ordering, wherein the total ordering comprises at least a offset clause and a limit clause to support paging of query results;
   causing, with the database query agent, the database query to be performed within a multitenant database environment with the clauses indicating one or more offset and limit values to be used in displaying results from the database query in a paged format on a user electronic device, wherein the one or more offset values indicate a subset within the results from the database query to be presented, wherein offset calculation is performed by a database server;
   imposing, with the database query agent, an order by clause on the results from the database query with the database server to ensure the query result set ordering is consistent; and
   returning, with the database query agent, the subset as determined by the one or more offset values to the user electronic device.

2. The method of claim 1 wherein the one or more offset values indicate a subset of rows within the results from the database query to return.

3. The method of claim 2 wherein the one or more offset values operate to impose a limit on the number of rows to return.

4. The method of claim 1 wherein the order is based on a query shape.

5. The method of claim 1 wherein the order is based on a query size.

6. An article comprising a non-transitory computer-readable medium having stored thereon instructions that, when executed by one or more processors, are configurable to cause the one or more processors to:
   receive, with a database query agent provided by a hardware database server, one or more paging queries, wherein the queries comprises salesforce object query language (SOQL) compliant query syntax, where the SOQL implemented in cloud APIs and does not use assertion consumer service (ACS);
   detect whether any of the one or more paging queries have not been specified with an explicit total order;
   enhance automatically and with the database query agent, for the one or more paging queries without an explicit total order with a total ordering, wherein the total ordering comprises at least a offset clause and a limit clause to support paging of query results;
   cause, with the database query agent, the database query to be performed within a multitenant database environment with the clauses indicating one or more offset and limit values to be used in displaying results from the database query in a paged format on a user electronic device, wherein the one or more offset values indicate a subset within the results from the database query to be presented, wherein offset calculation is performed by a database server;
   impose, with the database query agent, an order by clause on the results from the database query with the database server to ensure the query result set ordering is consistent; and
   return, with the database query agent, the subset as determined by the one or more offset values to the user electronic device.

7. The article of claim 6 wherein the one or more offset values indicate a subset of rows within the results from the database query to return.

8. The article of claim 7 wherein the one or more offset values operate to impose a limit on the number of rows to return.

9. The article of claim 6 wherein the order is based on a query shape.

10. The article of claim 6 wherein the order is based on a query size.

11. An apparatus comprising:
    means for receiving, with a database query agent provided by a hardware database server, one or more paging queries, wherein the queries comprises salesforce object query language (SOQL) compliant query syntax, where the SOQL implemented in cloud APIs and does not use assertion consumer service (ACS);
    means for detecting whether any of the one or more paging queries have not been specified with an explicit total order;
    means for enhancing automatically and with the database query agent, for the one or more paging queries without an explicit total order with a total ordering, wherein the total ordering comprises at least a offset clause and a limit clause to support paging of query results;
    means for causing, with the database query agent, the database query to be performed within a multitenant database environment with the clauses indicating one or more offset and limit values to be used in displaying results from the database query in a paged format on a user electronic device, wherein the one or more offset values indicate a subset within the results from the database query to be presented, wherein offset calculation is performed by a database server;
    means for imposing, with the database query agent, an order by clause on the results from the database query with the database server to ensure the query result set ordering is consistent; and means for returning, with the database query agent, the subset as determined by the one or more offset values to the user electronic device.

12. The apparatus of claim 11 wherein the order is based on a query shape.

13. The apparatus of claim 11 wherein the order is based on a query size.

14. A system comprising:
a server system to provide a multitenant environment, wherein the multitenant environment includes data for multiple client entities, each identified by a tenant identifier (ID) having one or more users associated with the tenant ID, users of each of multiple client identities can only access data identified by a tenant ID associated with the respective client entity, and the multitenant environment is at least a hosted database provided by an entity separate from the client entities, and provides on-demand database service to the client entities, the server system further configurable to receive, with a database query agent provided by a hardware database server, one or more paging queries, wherein the queries comprises salesforce object query language (SOQL) compliant query syntax, where the SOQL implemented in cloud APIs and does not use assertion consumer service (ACS), to detect whether any of the one or more paging queries have not been specified with an explicit total order, to enhance automatically and with the database query agent, for the one or more paging queries without an explicit total order with a total ordering, wherein the total ordering comprises at least a offset clause and a limit clause to support paging of query results, to cause the database query to be performed with the clauses indicating one or more offset and limit values to be used in displaying results from the database query in a paged format on a user electronic device, wherein the one or more offset values indicate a subset within the results from the database query to be presented, wherein offset calculation is performed by a database server, to impose an order by clause on the results from the database query with the database server to ensure the query result set ordering is consistent, and to return the subset as determined by the one or more offset values to the user electronic device.

15. The system of claim 14 wherein the one or more offset values indicate a subset of rows within the results from the database query to return.

16. The system of claim 15 wherein the one or more offset values operate to impose a limit on the number of rows to return.

17. The system of claim 14 wherein the order is based on a query shape.

18. The system of claim 14 wherein the order is based on a query size.

* * * * *